(12) United States Patent
Waid et al.

(10) Patent No.: US 6,932,384 B2
(45) Date of Patent: Aug. 23, 2005

(54) APPARATUS AND METHOD FOR CONTROLLING AN INFLATABLE CUSHION

(75) Inventors: Bryan T. Waid, Kettering, OH (US); James L. Webber, Shelby Twp., MI (US); Steven A. Damian, Springboro, OH (US); James K. Conlee, Dayton, OH (US)

(73) Assignee: Delphi Technologies, Inc., Troy, MI (US)

( * ) Notice: Subject to any disclaimer, the term of this patent is extended or adjusted under 35 U.S.C. 154(b) by 130 days.

(21) Appl. No.: 10/295,932

(22) Filed: Nov. 15, 2002

(65) Prior Publication Data

US 2004/0094941 A1 May 20, 2004

(51) Int. Cl.[7] .............................................. B60R 21/28
(52) U.S. Cl. ..................... 280/739; 280/742; 280/743.2
(58) Field of Search ................................ 280/738, 739, 280/743.2, 742

(56) References Cited

U.S. PATENT DOCUMENTS

| | | | |
|---|---|---|---|
| 5,489,199 A | 2/1996 | Palmer .................... | 280/743.2 |
| 5,746,447 A | 5/1998 | Dyer et al. .............. | 280/743.2 |
| 5,762,367 A * | 6/1998 | Wolanin .................... | 280/736 |
| 5,887,894 A * | 3/1999 | Castagner et al. ....... | 280/743.2 |
| 6,161,866 A | 12/2000 | Ryan et al. | |
| 6,170,871 B1 | 1/2001 | Goestenkors et al. .... | 280/743.1 |
| 6,186,540 B1 | 2/2001 | Edgren ........................ | 280/735 |
| 6,203,061 B1 | 3/2001 | Niederman et al. | |
| 6,213,502 B1 | 4/2001 | Ryan et al. | |
| 6,247,726 B1 | 6/2001 | Ryan | |
| 6,250,677 B1 | 6/2001 | Fujimura .................. | 280/743.2 |
| 6,286,859 B2 | 9/2001 | Derrick et al. ........... | 280/728.2 |
| 6,371,517 B1 | 4/2002 | Webber et al. | |
| 6,390,501 B1 * | 5/2002 | Greib et al. .............. | 280/743.2 |
| 6,409,209 B2 | 6/2002 | Amamori et al. ........ | 280/728.2 |
| 6,409,213 B2 * | 6/2002 | Webber et al. ............. | 280/739 |
| 6,419,267 B1 | 7/2002 | Hashimoto et al. ...... | 280/743.1 |
| 6,422,597 B1 * | 7/2002 | Pinsenschaum et al. .... | 280/735 |
| 6,431,583 B1 | 8/2002 | Schneider ................ | 280/728.2 |
| 6,431,596 B1 | 8/2002 | Ryan et al. | |
| 6,439,603 B2 | 8/2002 | Damman et al. | |
| 6,454,300 B1 * | 9/2002 | Dunkle et al. ............. | 280/742 |
| 6,499,765 B2 | 12/2002 | Hawthorn et al. | |
| 6,511,094 B2 * | 1/2003 | Thomas et al. ........... | 280/743.2 |
| 6,561,545 B2 | 5/2003 | Greib et al. | |
| 6,592,146 B2 | 7/2003 | Pinsenschaum et al. | |
| 6,616,184 B2 * | 9/2003 | Fischer ..................... | 280/743.2 |
| 6,634,671 B2 | 10/2003 | Heigl et al. .............. | 280/743.2 |
| 2002/0158456 A1 | 10/2002 | Fischer ..................... | 280/743.2 |
| 2004/0051285 A1 * | 3/2004 | Fischer ...................... | 280/739 |

FOREIGN PATENT DOCUMENTS

DE             3618060       * 12/1987

* cited by examiner

*Primary Examiner*—Eric Culbreth
(74) *Attorney, Agent, or Firm*—Scott A. McBain

(57) ABSTRACT

An air bag module, having a housing with at least one vent opening; an inflatable cushion being stored in an un-deployed position in the housing; an inflator for inflating the inflatable cushion, the inflator being in fluid communication with the inflatable cushion; a deployable member being configured to cover the at least one vent opening; a tether element being secured to the inflatable cushion at one end and the deployable member at the other; an actuator adapted to restrain or release the tether element wherein the deployable member is pulled away from the at least one vent opening when the actuator releases the tether, the at least one vent opening is in fluid communication with the inflatable cushion when the deployable member is pulled away.

19 Claims, 9 Drawing Sheets

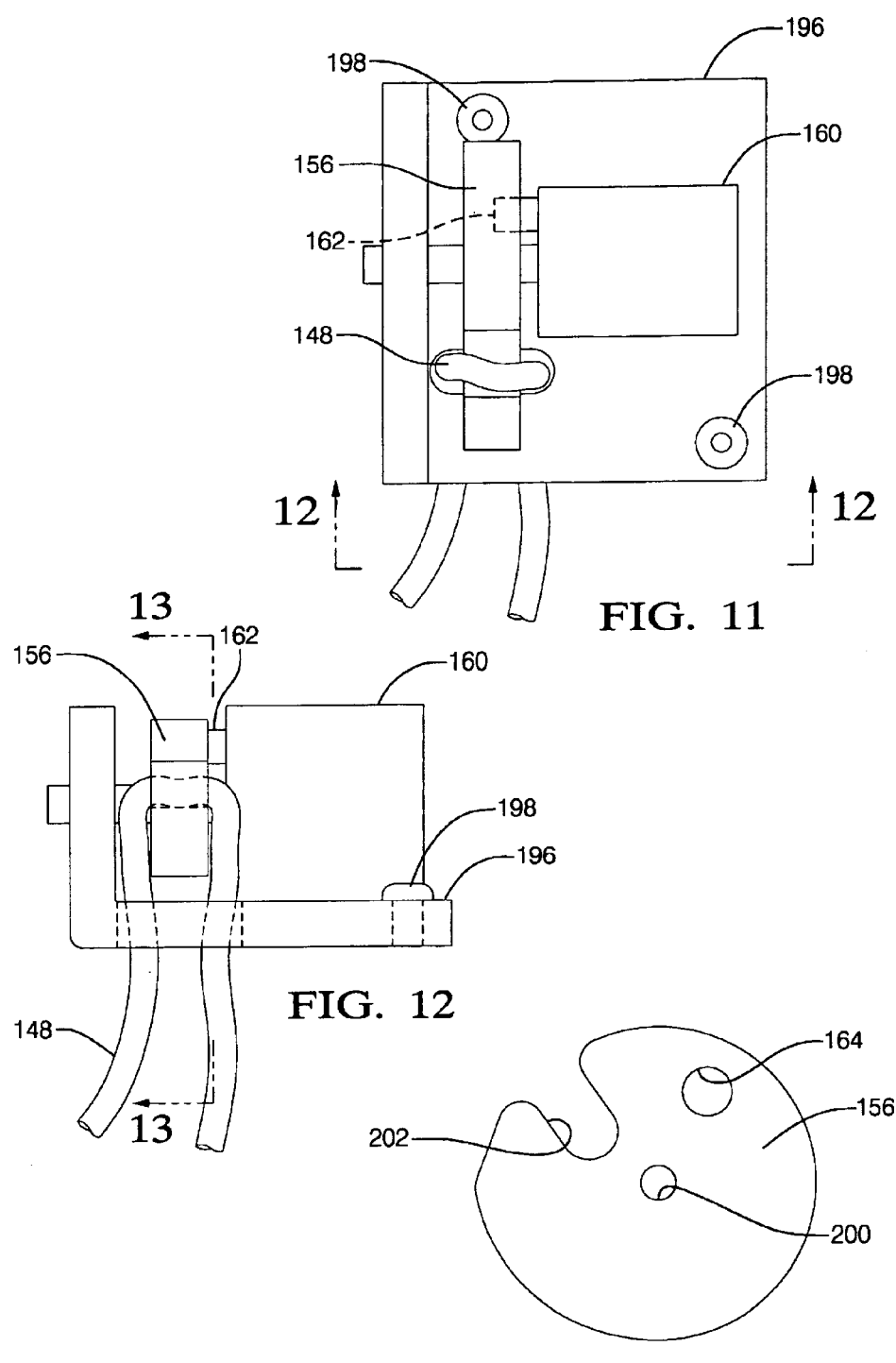

APPARATUS AND METHOD FOR CONTROLLING AN INFLATABLE CUSHION

TECHNICAL FIELD

This disclosure relates generally to air bags for vehicles. Specifically, this disclosure relates to systems and methods for controlling the deployment and venting of an inflatable cushion of an air bag module.

BACKGROUND

Air bag modules have become common in modern automobiles. An air bag module typically comprises an inflatable cushion and an inflator within a housing. The module is installed in a desired position within the vehicle, such as the steering wheel, the dashboard, the seat, the A-pillar, and other locations. The inflatable cushion is stored in a folded position within the housing in fluid communication with the inflator. In response to an activation event or occurrence, a sensor provides a signal for activating the inflator. The inflator provides a supply of inflating gas to the cushion to inflate the cushion, deploying it from the housing into the vehicle.

Various methods have been employed to more closely tie the inflation level of the inflatable cushion to specific conditions. For example, dual stage inflators have been used to increase or decrease the level of inflation of the inflatable cushion. Alternatively, variable venting schemes have been used to direct a portion of a generated inflation gas away from the cushion. Further, variable tethering systems have been used to restrict or vary the overall cushion volume.

SUMMARY

An air bag venting control system for use in a vehicle is provided. The system comprises a housing, an inflatable cushion, and an inflator, a tether, and a vent cover. The housing is installable in the vehicle in a selected spatial relation to a seating structure. The inflatable cushion is stored in an un-deployed position in the housing such that it can be deployed towards the seating structure.

An object of the present disclosure is to provide an air bag module, having a housing with at least one vent opening; an inflatable cushion being stored in an un-deployed position in the housing; an inflator for inflating the inflatable cushion, the inflator being in fluid communication with the inflatable cushion; a deployable member being configured to cover the at least one vent opening; a tether element being secured to the inflatable cushion at one end and the deployable member at the other; an actuator adapted to restrain or release the tether element wherein the deployable member is pulled away from the at least one vent opening when the actuator releases the tether, the at least one vent opening is in fluid communication with the inflatable cushion when the deployable member is pulled away.

Another object of the present disclosure is to provide a method for varying the venting of an inflatable cushion of an airbag module, by at least restraining a releasable element, being secured to a deployable member configured to cover venting apertures of the airbag module; and determining whether to restrain or release the releasable element by receiving a plurality of inputs from a plurality of sensors configured and positioned to provide data corresponding to a vehicle occupant.

Another object of the present disclosure is to provide a retaining ring for an inflatable cushion of an airbag module, comprising: a plurality of vent apertures; a deployable member being configured to cover the plurality of vent apertures; a tether for restraining the deployment of the inflatable cushion, the tether being secured to the inflatable cushion at one end and the deployable member at the other; and a releasable element secured to the deployable member at one end and a means for securing or releasing another end of the releasable element.

The above-described and other features of the present disclosure will be appreciated and understood by those skilled in the art from the following detailed description, drawings, and appended claims.

DRAWINGS

FIG. 11 is an enlarged view of the tether release mechanism for use with the FIG. 10 embodiment;

FIG. 12 is a view along lines 12—12 of FIG. 11; and

FIG. 13 is a view along lines 13—13 of FIG. 12.

DESCRIPTION OF THE PREFERRED EMBODIMENT

Figure 1:
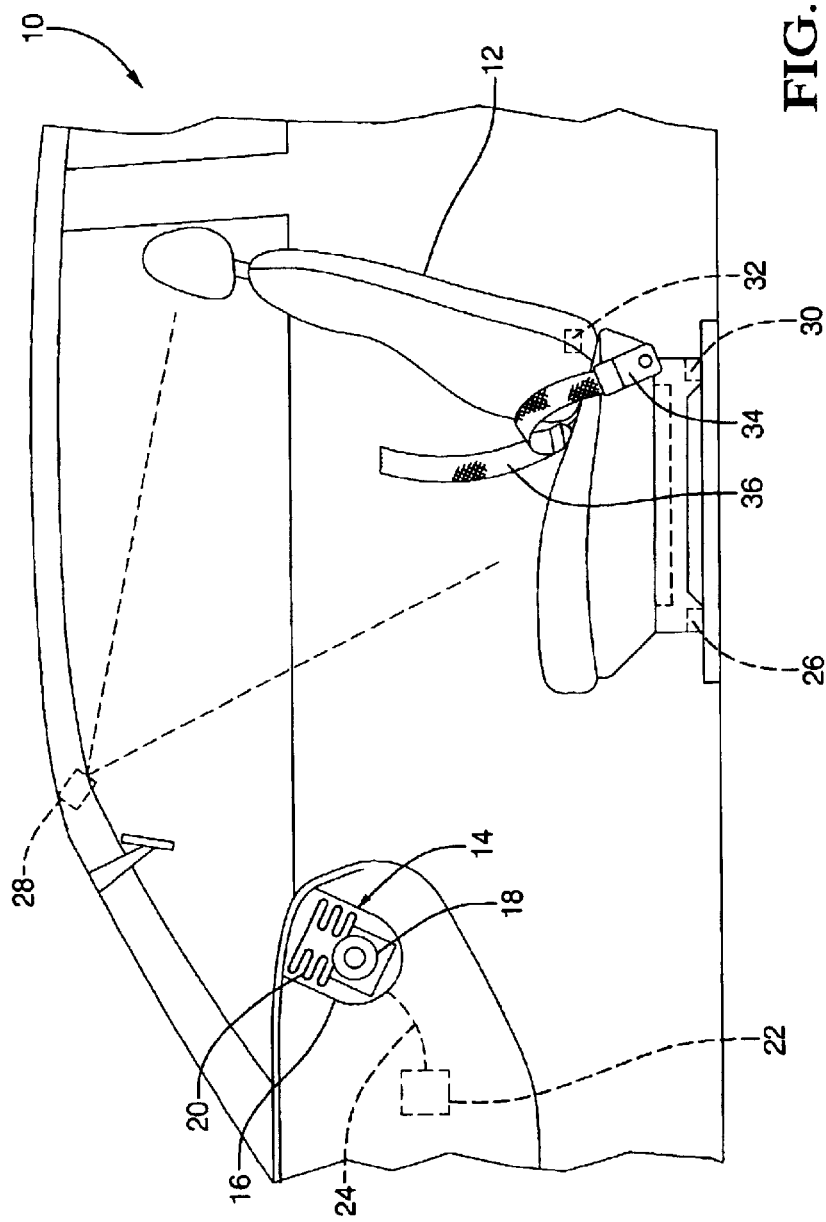
FIG. 1 is a partial view of a vehicle interior showing an air bag cushion in a stored or undeployed state.

Referring now to the Figures, and in particular to FIG. 1 a portion of an interior of a vehicle 10 is illustrated. Included in the interior compartment of vehicle 10 is a seating structure 12 and an air bag module 14 disposed in a selected spatial relationship with respect to seating structure 12. The air bag module 14 comprises a housing 16, an inflator 18, and an inflatable air bag or cushion 20. The module 14 is positioned in the vehicle 10 for deployment of the cushion 20 towards the seating structure 12.

A sensor or sensing-and-diagnostic module 22 is adapted to detect an activation event wherein the occurrence of a threshold event will cause an activation signal 24 to be generated and received by the inflator 18, thereby causing the inflator to inflate the inflatable cushion. The detection of the threshold event is determined by one or more sensors that are disposed about the vehicle in accordance with known technologies. Thus, the activation signal 24 controls the activation of the airbag module 14.

The inflatable cushion is stored in a folded or undeployed position in housing 16. The cushion is positioned to be in fluid communication with the inflator 18 wherein generation of the inflating gas will cause the cushion to inflate. Upon detection of an activation event by the sensing-and-diagnostic module 22, the inflator 18 is activated via signal 24 to generate the inflation gas. The inflation gas causes the cushion 20 to inflate and expand from housing 16 into the interior of the vehicle. It should be recognized that module 14 is illustrated by way of example only as being included in the dashboard of the vehicle. Of course, it is contemplated that module 14 can be installed for deployment in other regions of the vehicle, such as, but not limited to the steering wheel, the seat, the A-pillar, the roof, and other locations as well as other angular or positional relationships illustrated in FIG. 1.

Additionally, the present disclosure is also contemplated for use with various types of inflatable cushions and inflators. For example, cushions which are folded in a particular manner to achieve various deployment configurations and various types of inflators (e.g., dual stage inflators) may be employed.

In addition, and in accordance with the present disclosure, the sensing-and-diagnostic module can also be adapted to detect one or more conditions of the seating structure. For example, sensing-and-diagnostic module 22 can be adapted to detect one or more of the following: a load or amount of load (e.g., occupant weight) on the seating structure 12, a position of the seating structure, an angle of a portion of the seating structure with respect to another portion, the distance the seating structure is from the air bag module 14, and other data that is relevant to the deployment of the airbag by receiving input from a plurality of sensors disposed about the vehicle.

For example, the sensing-and-diagnostic module can receive inputs from one or more sensors such as, but not limited to, a seat position sensor 26, an optical scanner 28, a load sensor 30, a seat recline sensor 32, a seat belt use detection sensor 34, and a belt tensioning sensor (not shown). The sensors are positioned to provide input signals to module 22 indicative of one or more seat conditions. The one or more seat conditions combined with an occupant's size (e.g., weight determined by sensors) is inputted in a control algorithm resident upon a microprocessor disposed within the sensing and diagnostic module in order to determine a desired deployment scheme for the inflatable cushion. For example, the data inputs when compared to a look up table stored in the memory of the microprocessor or other readable format will allow the algorithm to determine whether a full deployment or partial deployment of the airbag is desired (e.g., tailoring of the airbag module by activating or not activating a system designed to modify the cushion deployment characteristics). The continuous sampling of the various sensors allows the sensing and diagnostic module to determine before an activation event (deployment) what type of deployment is desired. It is noted that the releasable tether device and venting system of the present disclosure is contemplated for use with any combination of the aforementioned sensors and it is not intended to be limited by the specific types of sensors discussed above. For example, the system is capable of operating with a single sensor input (e.g., occupant weight) or a multitude of inputs (e.g., occupant weight, seat position, seat belt operation, occupant height, etc.). Thus, any combination of sensors and sensor inputs may be used in order to assist with the deployment of the airbag.

The seat position sensor detects the position or distance of seating structure 12 with respect to air bag module 14. Similarly, the optical scanner 28 can be used to detect the position of seating structure 12. The load sensor 30 is disposed within the seating structure 12 and can be used to detect the load on the seating structure. Thus, sensor 30 is capable of detecting the specific weight or load on a portion of seating structure 12. The seat recline sensor 32 can be used to detect the degree or angle to which an upper or back portion of the seating structure 12 is reclined or positioned with respect to a lower or seat portion of seating structure 12. The seat belt use detection sensor 34 can determine whether the seat belt 36 is secured (e.g., buckled is inserted into its corresponding clasp). The seat belt tensioning sensor, alone or in combination with the load sensor 30, can also be used determine the load on the seating structure 12.

An exemplary embodiment of an air bag module for use with the present disclosure is illustrated in FIGS. 2–6. As will be described in detail below, air bag module 14 comprises means to customize or tailor the inflation level and venting of the inflatable cushion 20. The inflation level or cushion deployment range is commensurate with specific data inputs received from the plurality of sensors and is interpreted by the control module 22. More specifically, the air bag module 14 is configured to provide a fully inflated cushion 20 or a partially restrained cushion 20 upon deployment of the same. Furthermore, cushion 20 is also tailored during deployment using a dual stage inflator system wherein one inflator provides a greater inflation force than the other and the sequence of their firing provides different types of inflation profiles, which are initiated in response to or according to data received by sensors 26, 28, 30, 32 and 34.

Figure 3:
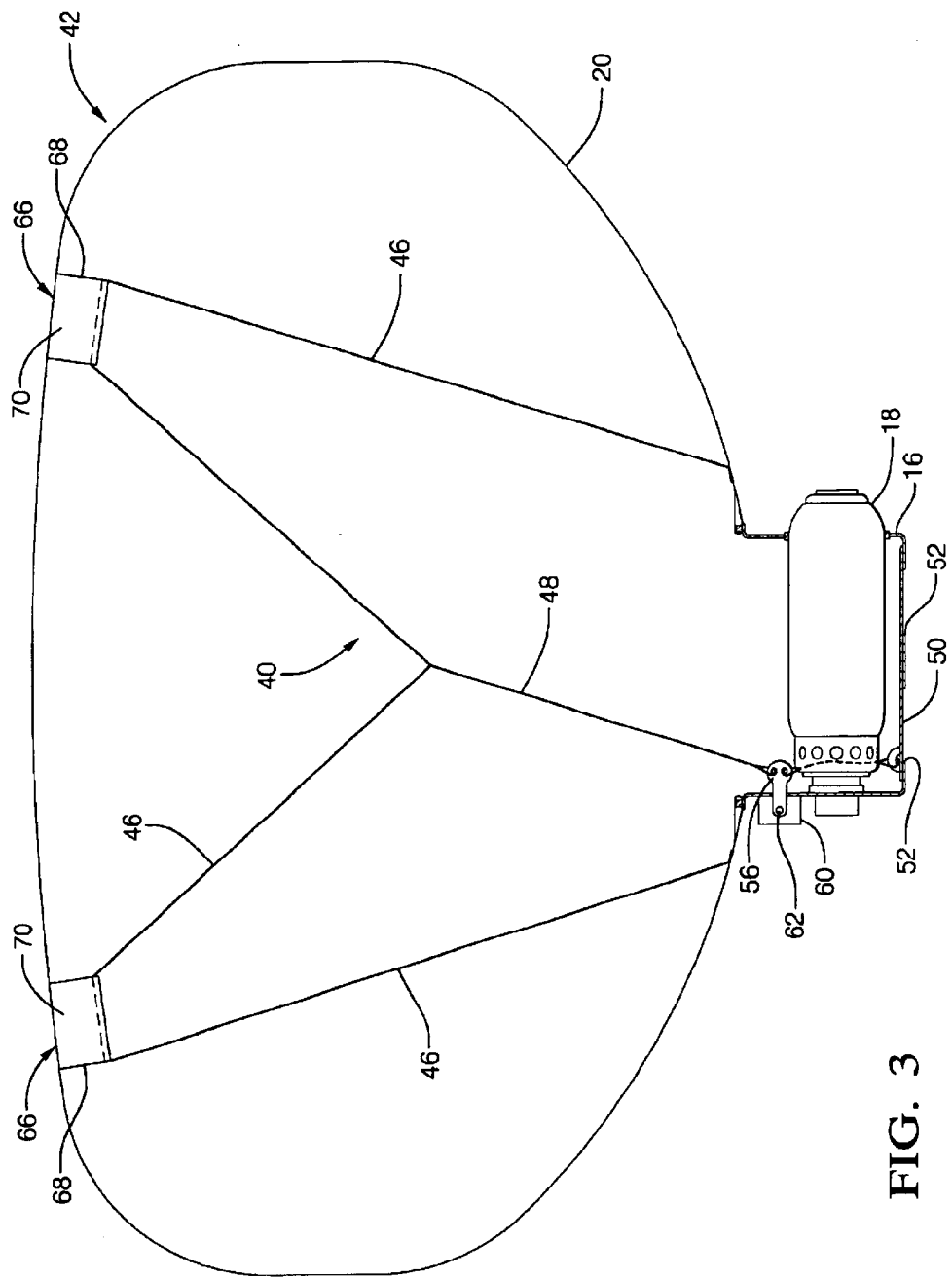
FIG. 3 illustrates an exemplary embodiment of an inflatable cushion in a first deployed state.
Figure 4:
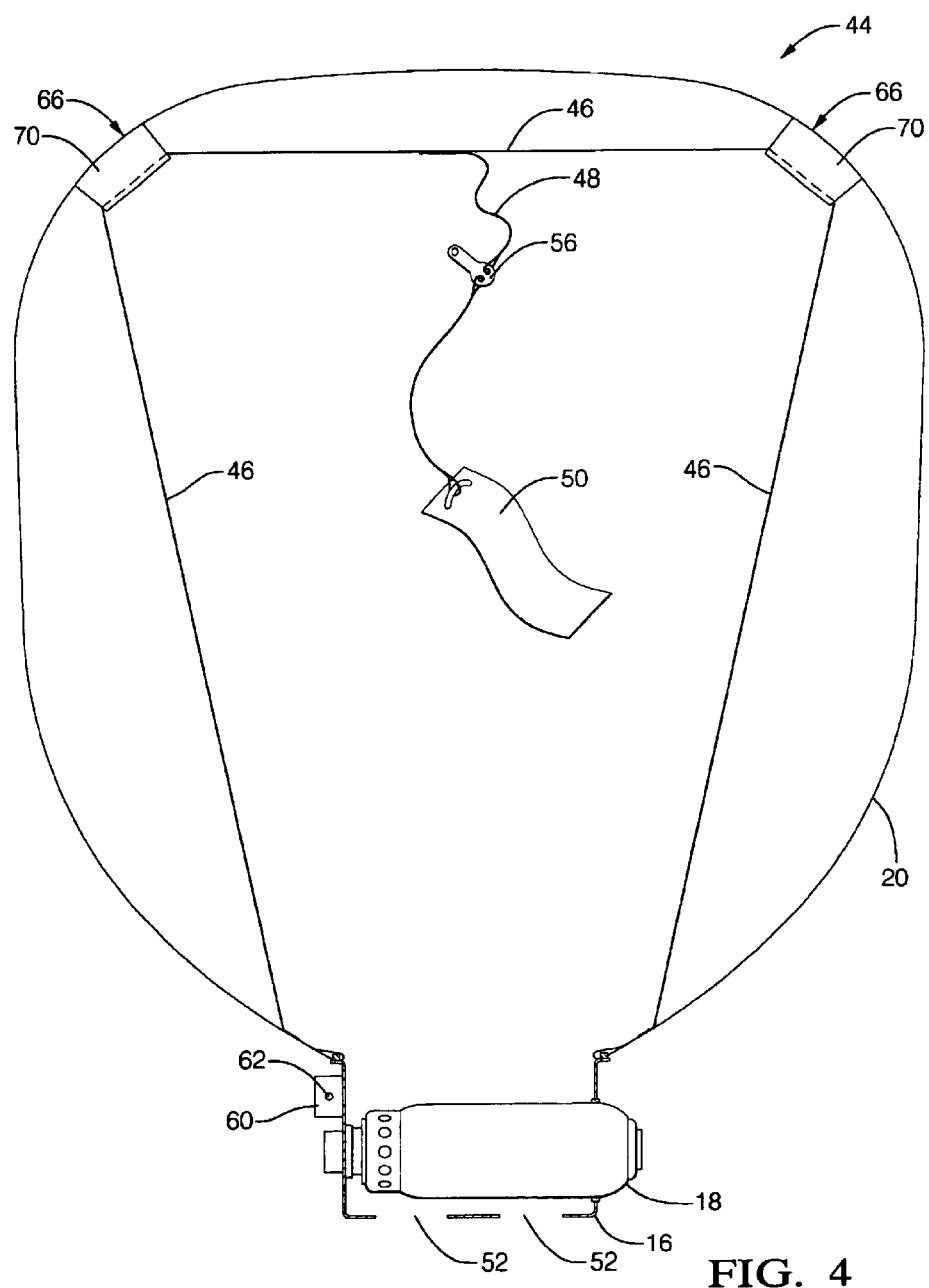
FIG. 4 illustrates the inflatable cushion of FIG. 3 in a second deployed state.

In order to provide two different levels of inflation, air bag module 14 also comprises a variable tether system 40. Variable tether system 40 is adapted to provide cushion 20 with either a first expanded state/profile 42 (FIG. 3) or second expanded state/profile 44 (FIG. 4). Thus, the variable tether system is configured to adjust the volume and rearward excursion (e.g., movement towards the seating structure 12) of the cushion.

The variable tether system comprises one or more tethering elements 46 connected to an inner surface of the cushion at either end, and a releasable element 48 connected to the tethering elements 46 between the end points of the tethering elements. Releasable element 48 releasably secures a portion of the tethering elements to the air bag module wherein the tethering element is restricted from fully expanding when the releasable element is secured to the air bag module and the tethering elements. In order to provide the first expanded state, releasable element 48 is not released from the air bag module 14 (FIG. 3). In order to provide the second expanded state, the releasable element is released from the air bag module 14 thereby allowing the tethering elements 46 to extend to their full length (FIG. 4). In this manner, variable tether system 40 is configured to provide the air bag module 14 with an adjustable volume for the cushion 20 (e.g., a larger volume in FIG. 4 and a smaller volume in FIG. 3).

Alternatively, a single tether comprises tethering elements 46 and releasable element 48 and is secured to the cushion at one end and as will be described below is secured to a device configured to either retain or release element 48 wherein the inflation forces of cushion 20 cause element 48 to open a venting aperture in housing 16.

In an exemplary embodiment, and referring now to FIGS. 2–6, releasable element 48 is secured to tethering elements 46 at one end and a deployable member 50 at the other end. Deployable member 50 is configured to cover a venting aperture 52 disposed in an exterior wall of housing 16. In an exemplary embodiment deployable member 50 is a thin aluminum sheet having its edges engaged within channels or features 54 disposed within housing 16. Accordingly, and during assembly deployable member 50 may be slid into housing 16 from either end as housing 16 has open ends prior to assembly of the airbag module. Alternatively, deployable member 50 is secured to housing 16 by other means or features (e.g., tabs or protrusions) that allow deployable member 50 to be releasably secured to housing 16. The length of releasable element 48 is shorter than the distance between the rearward edge of the inflatable cushion in FIG. 4 and the point of securement of deployable member 50 to housing 16. Thus, if releasable element 48 is released the inflatable cushion will pull element 48 taut until deployable member 50 is dislodged from housing 14.

Since deployable member 50 is a thin aluminum sheet or equivalent thereof it is easily pulled out of channels 54 once releasable element 48 has been released. Thus, the inflating forces of the expanding cushion are sufficient to pull member 50 out of channels 54. It is, of course, understood that one or more deployable member(s) 50 are contemplated for use in the present disclosure for covering one or more venting apertures 52. Deployable member or members 50 may be simply placed over vent apertures 52 as in a non-releasing deployment scenario the force of the inflation gases will cause member 50 to remain positioned over apertures 52. Also, in a preferred embodiment housing 16 is formed from an extruded material such as aluminum, although housing 16 may be constructed out of alternative materials providing the required rigidity and manufacturing qualities.

Figure 2:
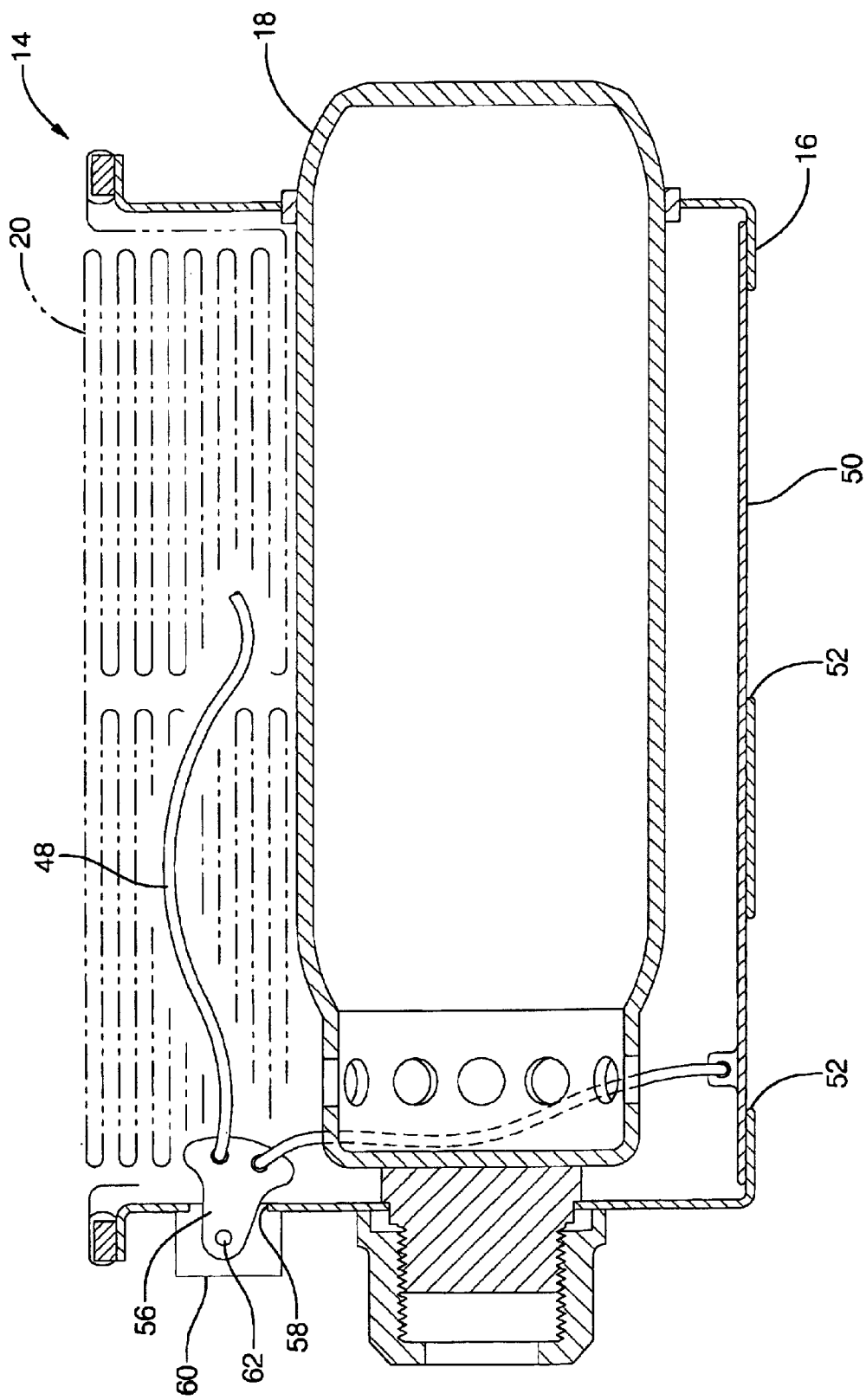
FIG. 2 is a cross-sectional view of a portion of an air bag module.
Figure 5:
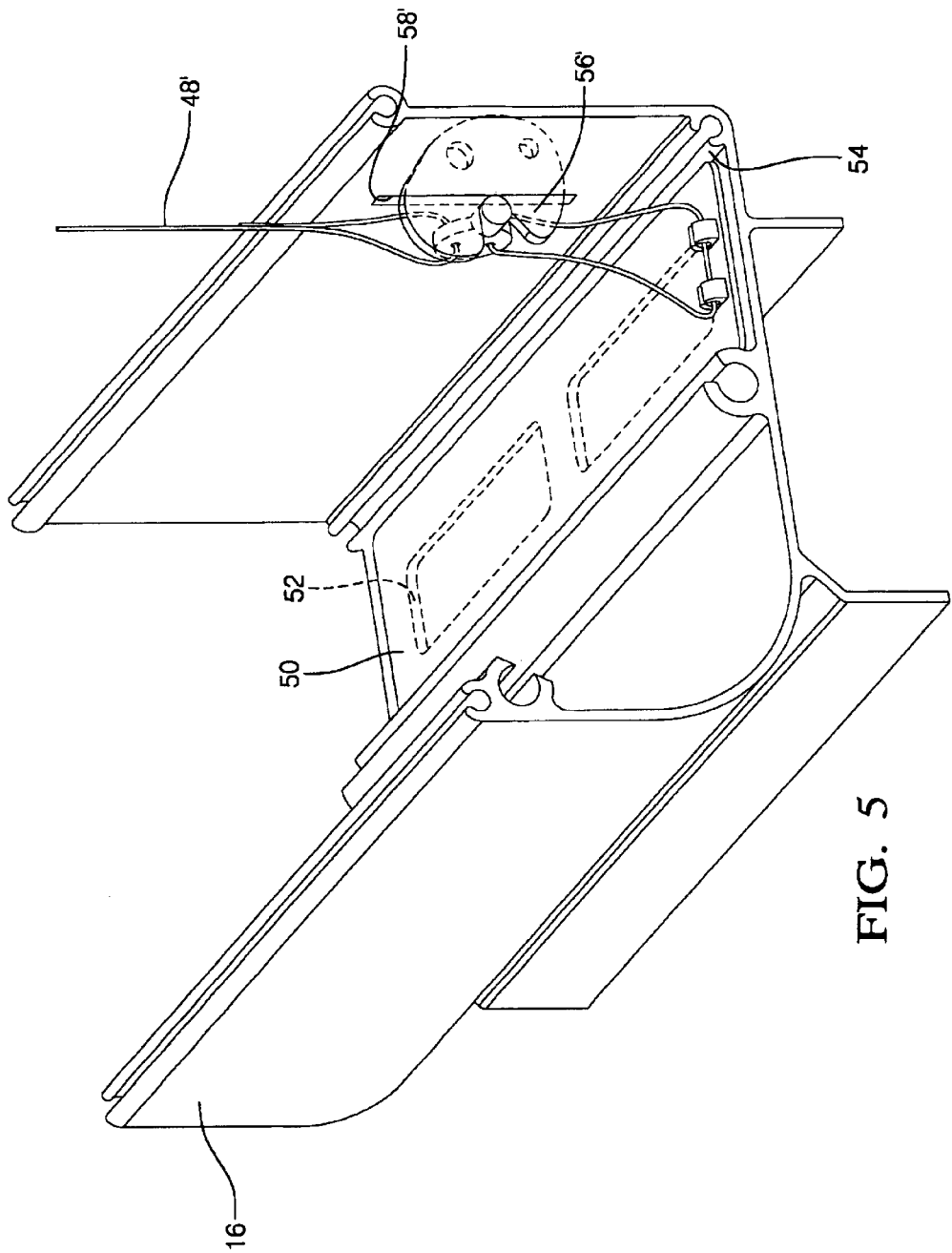
FIG. 5 is a perspective view of a portion of an exemplary embodiment of an airbag module.
Figure 6:
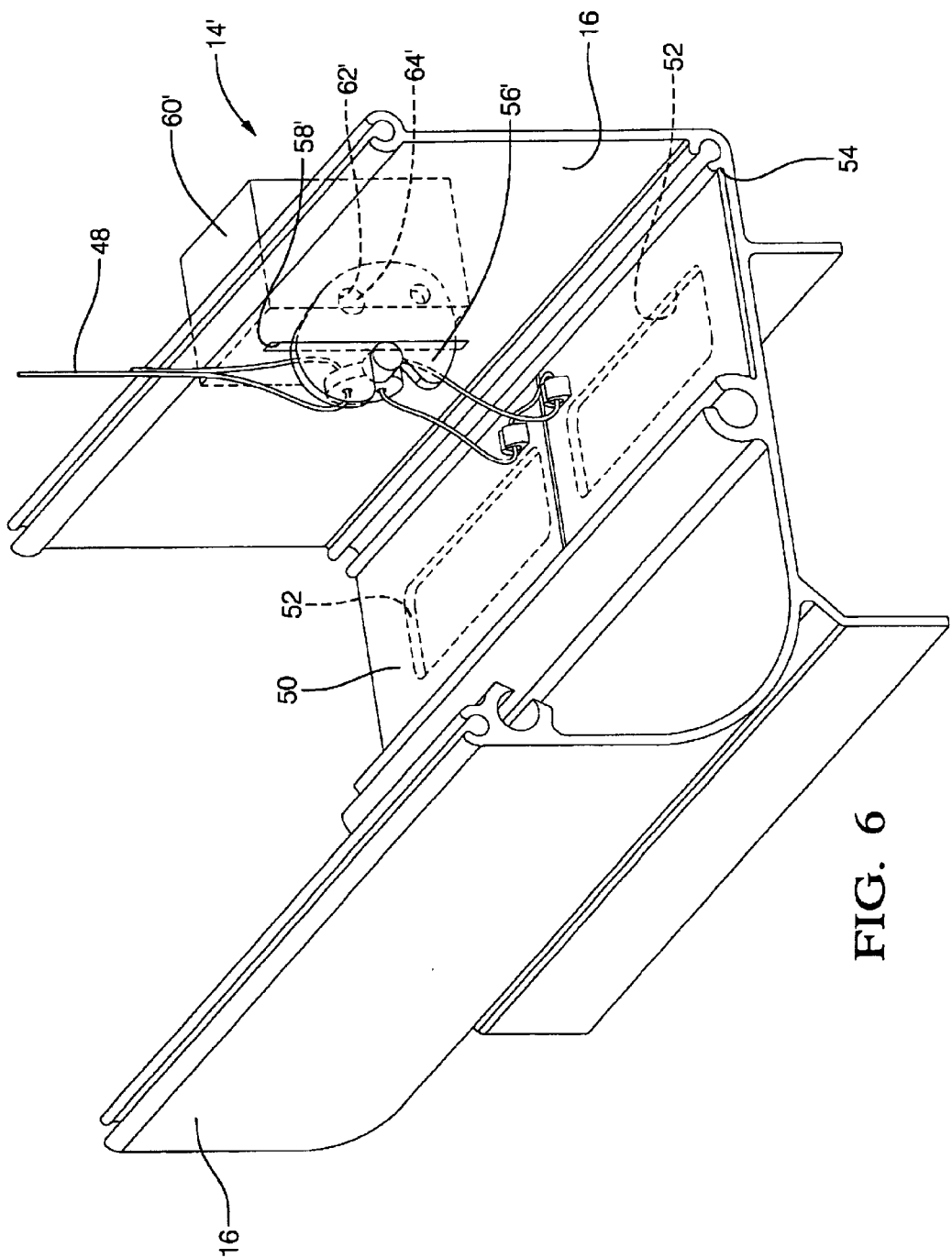
FIG. 6 is a perspective view of a portion of an exemplary embodiment of an airbag module.

A retaining member 56 is also secured to releasable element 48. Retaining member 56 is configured to pass through an opening 58 in an exterior wall of housing 16, as shown in FIGS. 2–4. In an exemplary embodiment, retaining member 56 is configured to have a smaller portion which passes through opening 58 when retaining member 56 is released and a larger portion which is larger than opening 58. While retaining member 56 and opening 58 are shown in the end walls in FIGS. 2–4, alternately retaining member 56' and opening 58' may be positioned in the sidewalls as illustrated in FIGS. 5 and 6, wherein prime numerals indicate elements similar to FIGS. 2–4. In FIGS. 5 and 6, retaining member 56' includes cam surfaces that rotate when the retaining member is released by plunger 62'.

Positioned adjacent to opening 58 is an actuator 60. Actuator 60 includes a plunger 62 or other type of retaining means configured for being received and engaged in an opening 64 of retaining member 56. Accordingly, and as retaining member 56 is partially inserted into opening 58 a portion of retaining member 56 is disposed within housing 16 and a portion is configured to extend outwardly from housing 16. Thus, the insertion of plunger 62 into opening 64 will prevent retaining member 56 from being dislodged from opening 58. In this configuration, retaining member 56 will assist in maintaining inflatable cushion 20 in its first expanded state/profile 42 as retaining member 56 is also secured to releasable element 48.

In an exemplary embodiment, actuator 60 is a solenoid having a plunger element 62 wherein receipt of an electrical current will cause plunger element 62 to move within an appropriate range allowing for plunger element 62 to be disengaged from opening 64 of retaining member 56. As an alternative, actuator 60 is a mechanical device configured to maintain plunger 62 in opening 64 until receipt of a signal from the sensing and diagnostic module 22, which instructs the mechanical device to remove plunger 62 from opening 64. For example, actuator 60 may be a squib or other pyrotechnic device capable of being fired to release plunger 62 from opening 64. Other alternatives may include shape memory alloys or springs.

Accordingly, actuator 60 is a device configured to receive an activation signal from the sensing and diagnostic module wherein upon receipt of a signal actuator 60 causes plunger 62 to be removed from opening 64 thereby allowing retaining member 56 to pass through opening 58 and allow the inflatable cushion to inflate to its fully inflated state. In addition, and when cushion 20 is inflated to its fully inflated state, deployable member 50 is also pulled away from venting apertures 52.

As an alternative plunger 62 merely provides a means for blocking retaining member 56 from being withdrawn from opening 58. For example, plunger 62 can interact with a surface of retaining member 56 thereby preventing unwanted movement.

Accordingly, and when a deployment signal is received and the inflatable cushion 20 of the airbag module 14 is inflated and the appropriate signal has been received by actuator 60, the cushion is allowed to fully inflate and the inflation forces within the cushion causes tethers 46 to pull releasable element 48 a sufficient distance so as to allow retaining member 56 to be removed from opening 58 as well as dislodge deployable member(s) 50. Accordingly, the vent openings 52 will be unblocked when cushion 20 is in its first or fully expanded state. This configuration will allow additional venting of the gases within cushion 20. Thus, when sensing and diagnostic module 22 detects that a fully inflated cushion is desired, vent openings 52 are unblocked. Vent openings 52 allow for venting during and post inflation of the cushion.

In an exemplary embodiment, the tethering element remains connected to at least two points of attachment 66 by being slidably received within an opening 68, which is defined by a loop of material 70 sewn or secured to the cushion. Preferably loop of material 70 is manufactured out of a low friction material which allows tether 46 to slide therethrough once retaining member 56 has been dislodged from opening 58. In this fashion, a single element may comprise tethers 46 and releasable element 48. Of course, tethering elements 46 are capable of being secured to more than two points in order to vary the configuration of the air bag cushion. Such points of attachment 66 can also be configured to provide for continued restraint of the air bag cushion. This is caused by the tethering elements even after the operative length is allowed to fully expand, that is, even with an enhanced operating length, the tethering element 46 continues to contour the profile of the air bag cushion 20. The material forming the tethering element 46 and the releasable element 48 is preferably of pliable nature such as a woven or knitted textile having a construction resistant to substantial elongation upon the application of tensile forces. A woven structure of nylon yarns is an example of such a material.

A control algorithm will determine whether the integrated variable tether and venting system of the present disclosure is to be activated. More specifically, the control algorithm will at least include a decision node that determines whether or not to activate actuator 60 by sending a signal, which will instruct actuator 60 to withdraw plunger 62 from opening 64 of retaining member 56. The decision node will at least base its decision upon the various inputs received by one or more sensors including for example, the position of seating structure 12 or other data. The inputs are detected and inputted into the algorithm by seat position sensor 26, optical scanner 28, seat recline sensor 32, and/or combinations thereof.

For example, if seating structure 12 is between a full forward position and a one-third forward position (e.g., if the seating structure is close to the air bag module 14), then decision node will determine that, the releasable element 48 will retain the cushion in the first expanded state 42.

However, if the seating structure 12 is between a one-third forward position and a full rearward position (e.g., if the seating structure is further away from the air bag module 14), then the decision node will activate the variable vent system of the present disclosure by way of initiating actuator 60. In this instance, the releasable element 48 is released such that the cushion is opened to the second expanded state 44 and venting is allowed to occur.

The above examples are merely examples of deployment scenarios wherein a single to sensor input or alternatively, a plurality of sensor inputs are used prior to the receipt of a signal indicative of an activation event to configure or modify the deployment characteristics of an airbag module prior to the deployment of the same. Accordingly, the above examples are for illustration purposes and are not intended to be construed as limiting the present disclosure.

As an alternative, retaining member 56 is configured to be rotatably received within opening 58 and releasable element 48 is wound about a portion of member 56. In this embodiment, plunger 62 prevents member 56 from rotating and releasable element 48 is not released. Once actuator or solenoid 60 manipulates plunger 62 member 56 is now capable of rotating within opening 58 and releasable element 48 will be released from retaining member 56 and accordingly will pull deployable member 50 away from venting apertures.

Figure 7:
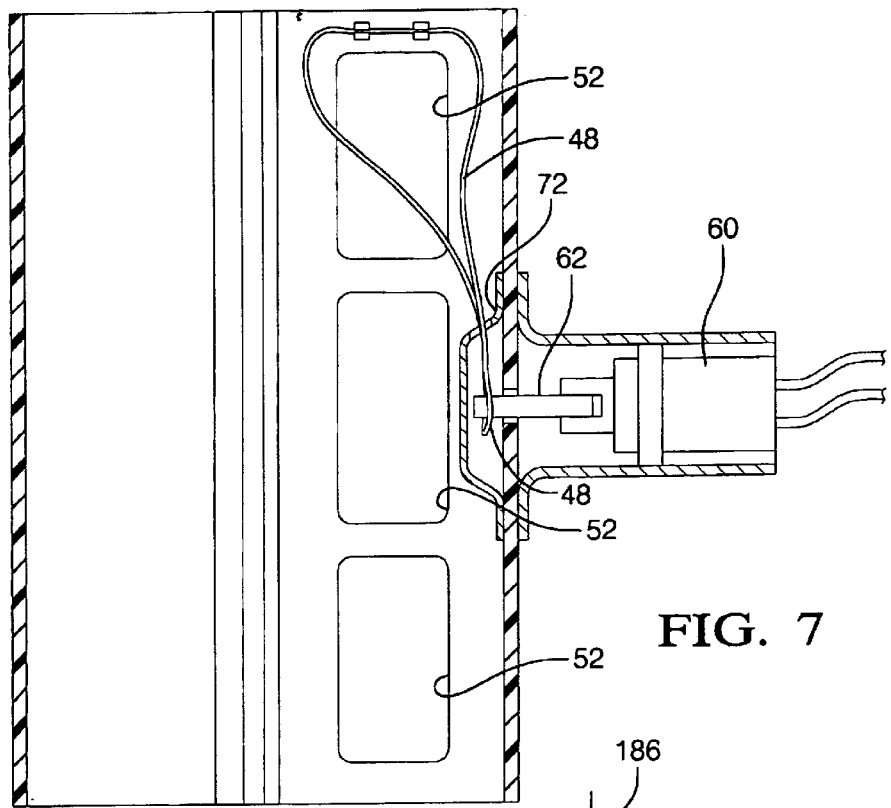
FIG. 7 is a top plan view of an alternative embodiment of the present disclosure.

In yet another alternative, and referring to FIG. 7 actuator or solenoid 60 is positioned so that plunger 62 passes through the opening in the housing and makes contact with an appropriate opening in releasable element 48 (represented schematically). In this embodiment releasable element or tether 48 is reinforced to receive plunger 62 within an opening in the tether. In this embodiment a tether guide 72 is positioned to guide releasable element 48 while also providing a backing plate to assist plunger 62 in securing release element 48.

Other configurations and embodiments of actuator 60 and retaining member 56 are within the scope of the present disclosure. For example, actuator 60 is illustrated as being positioned on the exterior of housing 16; however, it is contemplated that actuator 60 may be disposed within housing 16. In addition, other types of actuating devices are contemplated for example, pyrotechnic squibs or magnetic actuators are contemplated for use with retaining member 56 and releasable element 48.

Referring to FIGS. 8–12, an alternative embodiment of the present disclosure is illustrated. Here the releasable tether and venting device of the present disclosure is configured for use in a driver side airbag module. Here component parts performing similar or analogous functions are labeled in multiples of 100.

Figure 8:
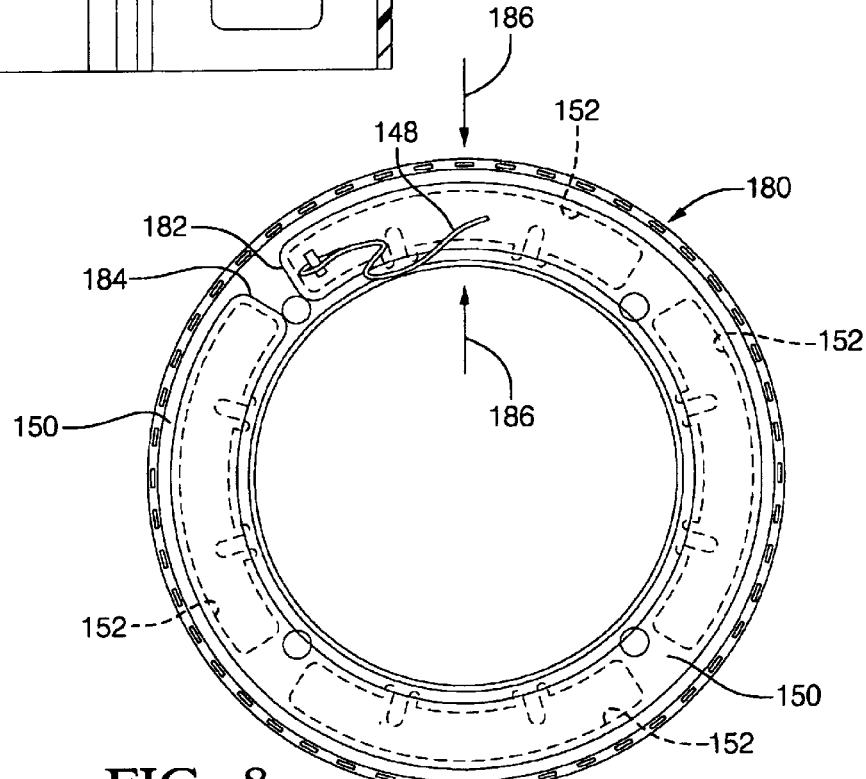
FIG. 8 is a top plan view of a retainer ring configured for use with a driver's side airbag module and an exemplary embodiment of the present disclosure.
Figure 9:
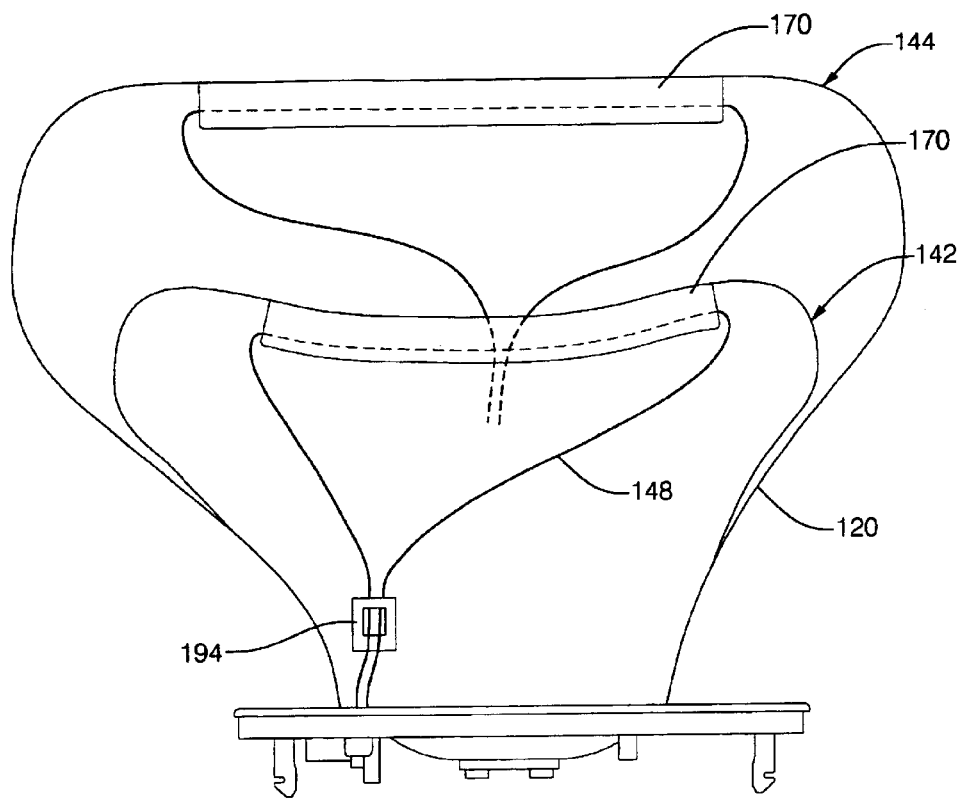
FIG. 9 is a side elevational view of a retainer ring configured for use with a driver's side airbag module and an exemplary embodiment of the present disclosure.

Referring now to FIG. 8 a circular retainer ring 180 for use with a driver's side airbag module 114 is illustrated. As is known to one skilled in the art a retainer ring is used to secure an opening of an inflatable cushion proximate to the inflating device. Typically, driver side airbag modules have circular, oval or round retainers corresponding to the opening of the inflatable cushion and the inflator. Of course, the present disclosure is contemplated for use with retainers of all shapes and sizes. In accordance with the present disclosure retainer ring 80 is provided with a plurality of venting apertures 152, which are covered by a corresponding deployable member 150. Deployable member 150 is constructed out of an Aluminum sheet or other metal or material such as a polymer which is thin enough to be pulled from venting apertures 152. Deployable member 150 is configured to have a corresponding shape that will cover apertures 152. In one embodiment the deployable member comprises an unclosed loop of material having two ends 182 and 184 that allow deployable member 150 to be removed from the retaining ring.

As discussed above deployable member 150 is secured to a releasable element which when released allows the cushion to fully inflate and cause deployable member 150 to be pulled from openings 152 thereby creating additional cushion venting.

Cushion retainer 180 may be of a standard size or alternatively and in order to provide larger venting apertures without affecting the structural characteristics of retainer 180 the width of the retainer 180 indicated by arrows 186 can be increased.

In this embodiment the releasable tether 148 (represented schematically) is secured to the side of the deployable member facing the backside of the driver side airbag module. Accordingly, actuator 160 is disposed on the backside of the airbag module in order to restrain or release tether 148 by manipulating a plunger between a tether restraining position and a tether releasing position.

Figure 10:
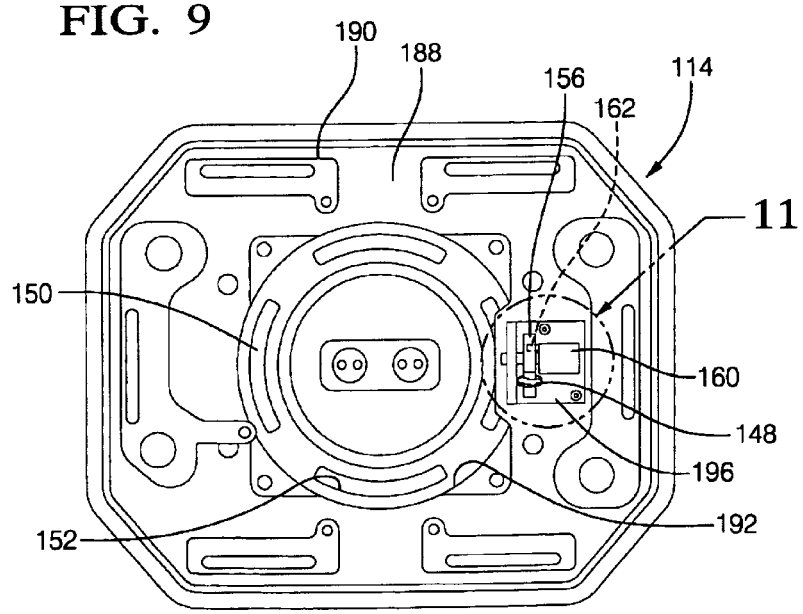
FIG. 10 is a bottom view of a driver's side airbag module configured for use with of the retainer ring of FIG. 8.

In addition, and referring to FIG. 10, a backing plate 188 and a retaining plate 190 of the driver side airbag module are each configured to have complimentary openings 192 configured to align with openings 152 of retaining ring 180 once deployable member 150 is removed from vent apertures 152 thereby allowing the gases of inflatable cushion 120 to vent out of the airbag module.

Inflatable cushion 120 also has a guide opening 194 sewn or secured to the inner surface of the cushion wherein the guide opening is large enough to allow at least one of the tethers to slide therethrough.

Referring now to FIGS. 11 and 12, an actuator contemplated for use with the driver side airbag module is illustrated. Here, actuator 160 is secured to the back side of the module by a mounting bracket 196 secured to either base plate 188 or retainer plate 190 by rivets 198 or other securing means and plunger 162 interacts with a retaining member 156 to either restrain or release tether 148.

For example and referring now to FIGS. 10–13 retaining member 156 is rotatably mounted between bracket 196 and actuator 160 by having a shaft or member rotatably received within a central opening 200. Retaining member 156 also comprises an engagement opening 202 for receiving a portion of tether 148. As described above a plunger 162 of actuator 160 engages in opening 164 to restrain movement of retaining member 156. Upon removal of plunger 162 from opening 164 the inflation forces and tension on tether 148 will cause retaining member 156 to rotate and will allow tether 148 to be unrestrained by slipping out of opening 202.

In addition, and in accordance with the above embodiment base plate 188, retainer plate 190 and bracket 196 will each have an opening to allow tether 148 to pass through and be secured to deployable member 150.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An air bag module, comprising:
   a housing having at least one vent opening;
   an inflatable cushion being stored in an un-deployed position in said housing;
   an inflator for inflating said inflatable cushion, said inflator being in fluid communication with said inflatable cushion;
   a deployable member being configured to cover said at least one vent opening;
   a tether element being secured to said inflatable cushion at one end and said deployable member at the other;
   an actuator adapted to restrain or release said tether element wherein said deployable member is pulled away from said at least one vent opening by said tether element when said actuator releases said tether, wherein said at least one vent opening is in fluid communication with said inflatable cushion when said deployable member is pulled away.

2. The airbag module as in claim 1, wherein said actuator is a solenoid secured to said housing, said solenoid comprising a plunger being capable of being manipulated between a first position and a second position by said solenoid, said plunger restraining said tether when said plunger is in said first position and said tether being released as said plunger moves from said first position to said second position.

3. The airbag module as in claim 2, wherein said plunger is received in an opening of a retaining member secured to said tether.

4. The airbag module as in claim 3, wherein a portion of said retaining member passes through an opening in said housing.

5. The airbag module as in claim 4, wherein said portion includes an opening being configured to receive and engage a portion of said plunger when said plunger is in said first position.

6. The airbag module as in claim 1, wherein said actuator is a solenoid secured to said housing, said solenoid comprising a plunger being capable of being manipulated between a first position and a second position by said solenoid, and the airbag module further comprising a retaining member rotatably mounted proximate to said plunger wherein said plunger prevents rotation of said retaining member when said plunger is in said first position.

7. The airbag module as in claim 6, wherein said retaining member is configured to have a receiving area for receiving and securing a portion of said tether element.

8. The airbag module as in claim 7, wherein the rotation of said retaining member allows said tether element to be released from said receiving area.

9. The airbag module as in claim 6, wherein said retaining member is configured to have a receiving area for receiving and securing a portion of another tether element secured to said deployable member, said another tether element being secured to said deployable member one side and said tether element being secured to another side of said deployable element.

10. The airbag module as in claim 9, wherein the airbag module is a driver side airbag module.

11. The airbag module as in claim 1, wherein inflatable cushion provides a first inflation configuration when said tether element is restrained and a second inflation configuration when said tether element is released.

12. The airbag module as in claim 11, wherein said first inflation configuration provides less rearward incursion of said inflatable cushion than said second inflation configuration.

13. The airbag module as in claim 1, wherein said tether element is slidably received within at least one tether guide positioned on a surface of said inflatable cushion.

14. The airbag module as in claim 13, wherein said tether at least one tether guide is positioned to vary the inflation configuration of said inflatable cushion.

15. The airbag module as in claim 1, wherein said deployable member comprises a pair of deployable members covering a plurality of venting apertures and said tether element is secured to said inflatable cushion at one end and said pair of deployable members at the other.

16. The air bag module as in claim 1, further comprising:
   a retaining ring for the inflatable cushion, the retaining ring comprising:
   a plurality of vent apertures;
   wherein said deployable member is being configured to cover said plurality of vent apertures and at least one of said plurality of vent apertures being aligned with said at least one vent opening of said housing.

17. The retaining ring as in claim 16, wherein said plurality of venting apertures are arcuate in shape and said deployable member is configured to cover said venting apertures.

18. An air bag module, comprising:
   a housing having at least one vent opening;
   an inflatable cushion being stored in an un-deployed position in said housing;
   an inflator for inflating said inflatable cushion, said inflator being in fluid communication with said inflatable cushion;
   a deployable member being configured to cover said at least one vent opening;
   a means for restraining or not restraining said inflatable cushion during deployment;
   wherein said deployable member is pulled away from said at least one vent opening by a tether when said inflatable cushion is not restrained and said at least one vent opening is in fluid communication with the interior of said inflatable cushion.

19. A method for varying the venting of an inflatable cushion of an airbag module, comprising:
   restraining a releasable element, said releasable element being secured to a deployable member configured to cover venting apertures of the airbag module; and
   determining whether to restrain or release said releasable element by receiving a plurality of inputs from a plurality of sensors configured and positioned to provide data corresponding to a vehicle occupant, wherein the inflation forces of the inflatable cushion cause said releasable element to remove said deployable member from said venting apertures when said releasable element is released.

* * * * *